United States Patent Office 2,787,648
Patented Apr. 2, 1957

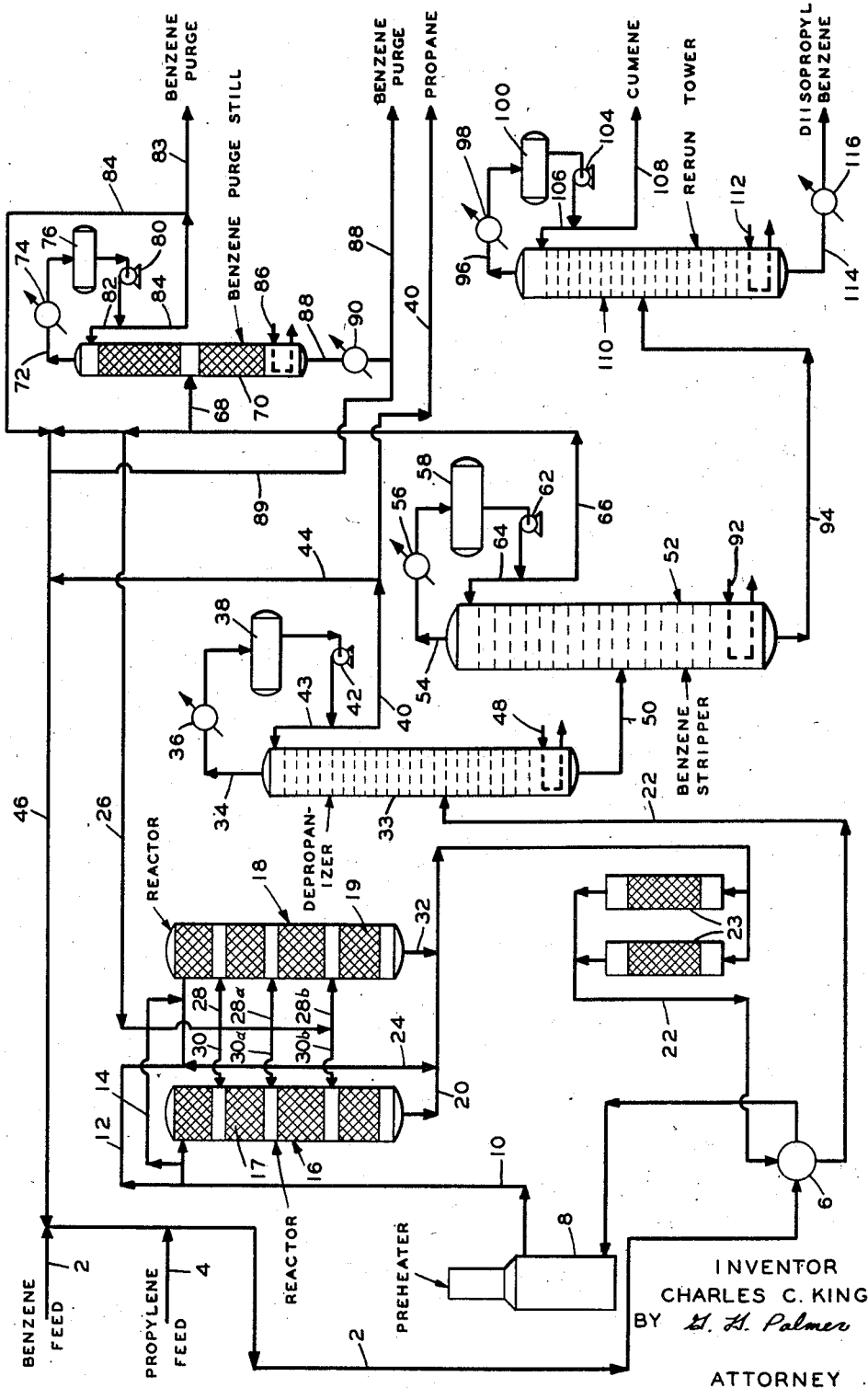

2,787,648

ALKYLATION OF AROMATIC HYDROCARBONS

Charles C. King, Short Hills, N. J., assignor to The M. W. Kellogg Company, Jersey City, N. J., a corporation of New Jersey Application June 14, 1954, Serial No. 436,424

12 Claims. (Cl. 260—671)

This invention relates to an improved process for alkylating aromatic hydrocarbons with olefin hydrocarbons. More particularly, it relates to a method of preparing an aromatic alkylate substantially free of impurities.

In the alkylation of aromatic hydrocarbons with olefin hydrocarbons it is frequently desirable to prepare a product of high purity, to be used, for example, as an intermediate in the production of other compounds. Due to the nature of the reactants and the catalysts ordinarily used in this type of reaction, it is difficult to obtain a 100% yield of the product desired and it is not at all unusual for quantities of undesirable side products to be produced. These unwanted products are best limited by closely controlling reaction variables, such as temperature, pressure, space velocity, etc., however, even with expert control some product purification is necessary.

A typical process illustrative of this problem is the preparation of isopropylbenzene or cumene from the alkylation of benzene with propylene. It has been found that the catalysts which most favorably promote this and similar alkylation reactions also tend to polymerize the olefin reactant with the result that the cumene product is contaminated with hexenes, nonenes and higher molecular weight polymers. In the conventional cumene process unreacted propylene and benzene are separated from the reaction zone effluent in distillation zones and are recycled to the alkylation zone for reuse. To facilitate purification of the cumene product it is customary to separate with the benzene recycle those compounds which boil below cumene, e. g., hexenes and nonenes. Since there is no way for them to otherwise leave the system these polymers tend to accumulate in the benzene recycle and are circulated through the reaction zone again and again. After a period of time the concentration of polymer contaminants becomes great enough to affect the efficiency of the alkylation reaction. It then becomes necessary to remove the contaminated benzene from the system and replace it with pure benzene. In addition to contaminating the benzene this method of operation also decreases product yield since reexposure of the recycled polymers to the alkylation catalyst promotes both further polymerization with propylene and reaction of the polymers with benzene, thereby producing additional undesirable compounds and increasing the consumption of both reactants. The contamination problem is further complicated when other impurities boiling between benzene and cumene are present in the fresh feed stream, for example, sulfur compounds. In such a case the introduction of a continuous stream of contaminants dilutes the benzene recycle even more quickly and conversion rate soon falls off.

When cumene is produced for consumption as an aviation fuel purity is not of prime importance, however, this material is also valuable as an intermediate in the production of phenol and for this use a high degree of purity is required.

It is an object of this invention to provide a method of preparing an aromatic alkylate substantially free of impurities.

It is another object of this invention to decrease the production of impurities in the alkylation of aromatic hydrocarbons with olefin hydrocarbons.

Still another object of this invention is to provide a method of reducing consumption of reactants in the alkylation of aromatic hydrocarbons with olefin hydrocarbons.

These and other objects will become more apparent from the folowling detailed description and discussion.

In a preferred embodiment this invention comprises reacting an aromatic hydrocarbon with an olefin in an alkylation zone, separating contaminated unreacted aromatic hydrocarbon from the reaction effluent, removing contaminants therefrom and returning the aromatic reactant to the alkylation zone.

Olefins which may be used in the alkylation reaction include both aliphatic and cyclic compounds, more usually, those having 2 to 6 carbon atoms, for example, ethylene, propylene, butylene, pentylene, etc. and cyclopropane, cyclobutene, etc. The aromatic hydrocarbons more frequently used in the application of this invention are benzene and alkyl substituted derivatives thereof. When a pure compound, such as cumene, is desired a single olefin and aromatic hydrocarbon are preferably reacted, however, it is within the scope of this invention to react mixtures of both olefins and aromatics.

The alkylation reaction proceeds over a wide range of temperatures varying from as low as about −40° C. to as high as about 500° C., depending upon the reactants and the type of catalyst used. It may be conveniently carried out under pressures at, or below atmospheric or as high as several hundred atmospheres.

Many types of catalysts have found use in the alkylation reaction including the better known Friedel-Crafts catalysts, for example, aluminum chloride, aluminum bromide and ferric chloride. Particularly useful in this reaction are zinc, tin and titanium chlorides, boron halides, sulfuric acid, hydrofluoric acid, phosphoric acid, etc. Also frequently used are solid adsorbent catalysts comprising oxides of the metals of group 3B or 4A of the periodic system in combination with silica oxide. Still other catalysts often used are the metal pyrophosphates.

This invention may best be described by considering a specific application thereof. It is particularly exemplified by the process in which benzene and propylene are reacted to form cumene. The alkylation of benzene with propylene is conducted in the presence of a catalyst at a temperature between about 100° C. and about 300° C., or more usually between about 150° C. and about 250° C. In order to maintain the reactants in the dense or liquid state and promote the desired alkylation reaction it is preferred to conduct the reaction at high pressures, usually between about 20 kg. per square centimeter and about 70 kg. per square centimeter. The space velocity varies with the type of catalyst, its activity and the temperature and pressure maintained in the reaction zone. Preferably the reaction is carried out at a space velocity between about 1.0 kg./hr. of reactants per kg. of catalyst and about 4.0 kg./hr. of reactants per kg. of catalyst. Also of importance in obtaining a high product yield is the ratio of hydrocarbon reactants. An excess of benzene is a definite requirement of this process and the required ratio of benzene to propylene, between about 1.5 mols per mol and about 15.0 mols per mol, is obtained by recycling unreacted benzene to the reaction zone. Any of the catalysts previously mentioned may be used in the alkylation reaction, however, the metal oxides or metal pyrophosphates are particularly efficient in this process.

In a typical operation, benzene and propylene are admitted after preheating into one or more reaction chambers containing one of the aforementioned catalysts. In the passage of the hydrocarbons through the catalyst chambers various reactions occur. Benzene and propylene react, of course, to form cumene. Because of the polymerizing characteristics of the alkylation catalyst some propylene reacts with itself to form hexene which in turn reacts with additional propylene to form nonene or still higher polymers of propylene. The amount of propylene converted to polymers varies between about 0.5 and about 15% depending on the reaction conditions. In addition to the polymerization reactions each and any of the polymers may, and do to some extent, react with the benzene feed. Another important reaction which takes place, forming a product second in quantity only to the cumene, is the reaction of two propylene molecules with one benzene molecule to form diisopropylbenzene.

The effluent from the alkylation reaction zone is passed through several separation stages which eventually culminate in a cumene stream of high purity. Substantial amounts of the feed materials fail to react in their initial passage through the catalyst zone. The first two separation stages are devoted to the removal of unreacted propylene and benzene which are separately recycled to the reaction zone for reuse. The lower boiling propylene polymers tend to accumulate in the benzene recycle and normally are recirculated through the conversion zone, thus providing additional chances for reaction of these compounds with the propylene or benzene reactants and also providing for a build-up or accumulation of polymers in the system. Eventually, the concentration reaches the point where these compounds adversely affect the alkylation reaction. To prevent this undesirable result a portion of the benzene recycle is passed through a purge still in which the polymers are separated therefrom by distillation and the substantially contaminant free benzene is then returned to the alkylation zone. In this separation step any other impurities, which by reason of their boiling temperatures, are concentrated in the benzene recycle, are also removed. This applies in particular to impurities which enter the system in the hydrocarbon reactants.

It is within the scope of this invention to operate the distillation step so that either hexenes or nonenes are removed from the benzene. The hexenes, which boil at a temperature lower than benzene, are removed overhead during one operation and the nonenes, which boil at a temperature higher than benzene, are removed from the bottom of the distillation tower in another operation. The concentration of contaminants in the system may, of course, be varied by varying the proportion of the benzene recycle which is passed through the purge still.

Removal of the contaminants from the benzene stream has several important and beneficial effects. The reaction efficiency is thereby maintained at a high level, resulting in a maximum production of cumene with a minimum consumption of reactants. In addition, the consumption of benzene is sharply decreased since it is unnecessary to replace the unit inventory of benzene or any portion thereof in order to purge the system of contaminants. The method of this invention by eliminating this problem substantially decreases unit down-time and operating expenses.

In order to more clearly illustrate the invention and to provide a better understanding thereof reference is had to the attached drawing which is a diagrammatic illustration of a unit designed for the production of cumene.

Referring to the drawing, benzene is combined through conduit 2 with a propylene feed from conduit 4. To this mixture is added recycle propylene and benzene from conduit 46 in an amount to provide a total feed mixture in which the benzene to propylene ratio is about 5 mols per mol. Although it is within the scope of this invention to utilize mixtures of olefins, in order to obtain a relatively pure product it is desirable that the olefin feed be restricted to one olefin, in this case, propylene. Since the propylene feed is usually obtained from a gaseous hydrocarbon stream originating in a refinery, quantities of propane which has a boiling temperature very near to propylene, are present in the propylene feed. In this particular illustration the propane comprises about 2.5% of the olefin feed.

It is necessary, in order to provide conditions suitable for carrying out the reaction, that the feed be preheated to about 225° C. A portion of this heat is obtained by exchange with the effluent from reactors 16 and 18 in a conventional heat exchanger 6. The feed mixture passes from the exchanger through conduit 2 to preheater 8 and the hot feed at a temperature of about 225° C. leaves preheater 8 through conduit 10 and enters the top of reactor 16.

Reactor 16 is a vertical cylindrical vessel containing a number of separate beds of granular copper pyrophosphate catalyst. Two reactors 16 and 18 are pictured in this illustration and they may be used either simultaneously or alternately. It is customary in carrying out the alkylation reaction for the copper pyrophosphate catalyst to become inactive after a period of sustained use. In order to provide for continuous operation it is necessary to switch the reactants to a reactor containing active catalyst while the operation of removing spent catalyst and replacing it with new catalyst is carried out in the other reactor.

Assuming reactor 16 to be in use, the hot feed enters the top portion of the reactor and passes downward through successive beds 17 of catalyst leaving the reactor through conduit 20 at a temperature of about 225° C. The pressure in the reactor is maintained at about 60 kg. per square centimeter. During this passage through the reactor a portion of the benzene and propylene react to form cumene. In addition a small amount of diisopropylbenzene is also formed and polymerization of propylene takes place to form about 2.0 volume percent hexenes, nonenes and higher boiling polymers based on the fresh propylene feed.

The reactions which take place in the alkylation reactor 16 are highly exothermic. In order to remove heat of reaction and maintain isothermal operation the cooling fluid is admitted to the reactor through a plurality of lines 30, 30a and 30b, one of which terminates above each bed of catalyst 17. By varying the flow of cooling medium through these lines the temperature in each bed is closely controlled. In this specific illustration the cooling medium is supplied by benzene recycle from the benzene stripper 52. The coolant stream is passed through conduit 26 for admission above each catalyst bed in the reactor. The amount of coolant so admitted is controlled to give a substantially uniform temperature throughout the reactor.

The reaction effluent leaving the reactor 16 passes through marble pots 23 in which phosphoric acid released from the catalyst during the alkylation reaction is removed, and the acid free stream is then passed through heat exchanger 6 giving up heat to the fresh feed. From the exchanger this stream passes through conduit 22 into the depropanizer 32 for separation of the lighter hydrocarbons contaminated therein. Propane and unreacted propylene are removed overhead from the depropanizer through conduit 34 passing through a conventional water condenser 36 and into an accumulator 38. A portion of the accumulator liquid is passed through pump 42 and conduit 43 as reflux to the depropanizer. The remainder is pumped through conduit 40 and is divided into two streams, one being recycled to the feed through conduit 44 and the other being yielded from the unit through conduit 40. The latter stream contains propane in an amount equivalent to that entering the unit in the propylene feed. The heat required to effect the removal of these low boiling compounds is provided by a conventional reboiler 48 in the bottom of the depropanizer. The depropanized bottoms are passed from the depropanizer through conduit 50 to the benzene stripper. The temperature in this tower is regulated so that substantially all of the materials boiling above cumene including benzene, hexenes and nonene are removed in the overhead stream. The overhead vapors pass through conduit 54 to a conventional water condenser 56 and into an accumulator 58. A portion of the condensed overhead is returned to the tower as reflux through pump 62 and conduit 64. Of the remainder, the major part passes through conduit 66 to the benzene feed as recycle and the rest, about 1% of the net overhead, enters conduit 68 and passes from there into the benzene purge still. Both the recycle stream and the charge to the purge still contain about 1.0 volume percent hexenes and nonenes. To accommodate this small feed, it is preferable to use a packed tower containing a conventional packing material such as Raschig rings, Berl saddles, etc., for the purification of the benzene stream rather than a tower with distillation trays. In order to provide a rectifying and a stripping section the feed enters in the middle portion of the tower between two separate beds of packing.

As mentioned before the purge tower may be operated to remove either hexenes or nonenes. The time on either, or the preferred operation, if only one operation is performed, will vary according to the amount of each contaminant present. The purge still is operated in a conventional manner with the overhead vapor passing through conduit 72, a conventional water condenser 74 and into accumulator 76. Tower reflux is supplied from this accumulator from pump 80 and conduit 82. When the still is being operated to remove hexenes, the remaining overhead passes through conduit 84 and conduit 83 and is yielded from the unit as benzene purge. The bottoms from the purge still exit from conduit 88, are cooled in a conventional water exchanger 90 and are returned to the alkylation zone through conduit 89. The heat required to effect this separation is provided by a conventional reboiler 86. When nonene is the contaminant to be separated from the benzene the operation of the purge still is very similar, however, in this instance, the bottoms are purged through conduit 88 and the net overhead is combined with the benzene feed through conduit 84. The benzene purge comprises a mixture of polymer contaminants and benzene in a volume ratio of about 1 to 3. Although the purged material is undesirable in the process and in the cumene product, it is not without value, for example, because of its high octane rating it is advantageously blended with gasoline.

The bottoms from the benzene stripper 52, comprising a mixture of cumene and diisopropylbenzene plus small amounts of high boiling polymers, are passed through conduit 94 to a rerun tower 110. The cumene is taken overhead from this tower through conduit 96 and condenser 98 into accumulator 100. A portion of the condensed liquid is refluxed to the tower through pump 104 and conduit 106. The remainder, substantially pure cumene, is yielded through conduit 108. The heat required for the separation is provided by a conventional reboiler 112. The bottoms from this separation are passed through conduit 114, cooled in an exchanger 116 and are also yielded from the unit.

It is not intended that the invention be restricted in scope by this specific application thereof. Other types of catalyst arrangements, flow schemes, methods of removing reaction heat, etc., well known to those skilled in the art, are also contemplated for use with similar results. The distillation method has been used to illustrate the removal of olefin contaminants, however, these and other contaminants may be separated by other conventional methods, such as selective absorption, within the scope of the invention.

The following data is given as an example of a full-scale commercial application of this invention.

*Example*

A propylene stream containing 1% ethane, 96.5% propylene and 2.5% propane by volume was combined with benzene to form an alkylation feed. The fresh charge rate for the test period was 1300 kg. per hour of propylene and 3000 kg. per hour of benzene. To this was added 19,300 kg. per hour of recycle benzene and 2400 kg. per hour of recycle propylene to provide a gross feed rate of 26,000 kg. per hour. This material was preheated to a temperature of 163° C. by heat exchange with effluent from the alkylation reactors and was passed through a fired heater where the temperature was further increased to 216° C. The mixture was then passed through a series of separated catalyst beds enclosed in a reaction chamber. The catalyst used was a granular copper pyrophosphate supported on and spaced with charcoal, the composition being in the ratio of approximately two parts of charcoal to one part of copper pyrophosphate. Isothermal operation within the reaction chamber was maintained by admitting cool recycle benzene above each catalyst bed in an amount sufficient to absorb the heat released in the alkylation reaction. In order to maintain the feed and reaction products in the dense or liquid state at the reactor temperature, that is, about 230° C., a high back pressure, about 60 kg. per square centimeter was held on the reactor. The reactor effluent, containing a mixture of cumene, diisopropylbenzene, hexenes, nonenes and higher molecular weight polymers and small quantities of contaminants admitted in the feed stream, was passed through marble pots for the removal of phosphoric acid and then through a separation system similar to that described and illustrated in the accompanying drawing.

The benzene purge still was operated for the removal of nonenes, with a top temperature of 79° C. and a bottom pressure of atmospheric. 210 kg. per hour of benzene recycle, comprising about 1% of the total overhead yield from the benzene stripper, was charged to the benzene purge still. The net overhead from the still was about 190 kg. per hour with the remainder of the charge, 20 kg. per hour, leaving from the bottom of the still as benzene purge. Data on the composition of the various yield streams and the benzene recycle are presented in the accompanying Table I.

*Table I*

| | Flow Rate, kg./hr. | Composition—Percent | | | |
|---|---|---|---|---|---|
| | | Benzene | Hexenes | Nonenes | Cumene |
| Cumene Product | 3,500 | | | 0.64 | 99.36 |
| Recycle Benzene | 19,300 | 94.10 | 0.90 | 2.50 | 2.50 |
| Benzene Purge Still Charge | 210 | 94.10 | 0.90 | 2.50 | 2.50 |
| Benzene Purge Still Bottoms | 20 | 52.00 | | 22.00 | 26.00 |

The efficiency of the nonene separation in the purge still is apparent from the composition of the streams present in the accompanying table. During the period of this operation a purge stream was yielded which contained a nonene concentration approximately 10 times greater than the concentration of nonene in the feed to the purge still. This was obtained by purging a stream which amounted to less than 0.2% of the total recycle benzene. It is apparent from this test that substantial quantities of nonene can be removed within a short period of time thus allowing sufficient opportunity for operation of the purge still to remove hexenes or other low boiling contaminants.

The preparation of cumene has been described specifically with reference to a liquid phase operation, however, this reaction may be carried out also in the vapor phase and the specific application is not to be construed as a limitation of the invention to a liquid phase process.

Having thus described my invention by furnishing a specific example thereof, it is to be understood that no undue limitations or restrictions are to be imposed by reason thereof, but that the scope of the invention is defined by the appended claims.

I claim:

1. In a process for alkylating aromatic hydrocarbons with olefin hydrocarbons in which the alkylation reactants are passed through a reaction zone maintained under conditions suitable to effect said alkylation reactions and the reaction zone effluent containing alkylation polymer contaminants is passed through a separation system wherein unreacted olefins and aromatic hydrocarbons containing said contaminant materials are separated from the alkylate and are recycled to said reaction zone, the method of controlling the concentration of contaminants in the system which comprises passing a minor portion of about 1% of the total recycle aromatic hydrocarbons through a separation zone for the removal of said contaminants before returning said minor portion to the reaction zone.

2. The process in claim 1 in which the contaminant materials are olefin polymers formed in the alkylation reaction.

3. The process in claim 1 in which a portion of the contaminant materials are admitted to the reaction zone in the alkylation reactants.

4. The process of claim 1 in which the contaminant materials comprise a mixture of olefin polymers formed in the alkylation reaction and compounds admitted to the alkylation zone in the alkylation reactants.

5. In a process for alkylating aromatic hydrocarbons with olefin hydrocarbons in which the alkylation reactants are passed through a reaction zone maintained under conditions suitable to effect said alkylation reactions and the reaction zone effluent containing alkylation polymer contaminants is passed through a separation system wherein unreacted olefins and aromatic hydrocarbons containing said contaminant materials are separated from the alkylate and are recycled to said reaction zone, the method of controlling the concentration of contaminants in the system which comprises passing a minor portion of about 1% of the total recycle aromatic hydrocarbons through a distillation zone for the removal of said contaminants before returning said minor portion to the reaction zone.

6. In a process for alkylating benzene with propylene to form cumene in which the alkylation reactants are passed through a reaction zone maintained at a temperature between about 150° C. and about 300° C. and at a pressure between about 20 kg. per square centimeter and about 70 kg. per square centimeter and the reaction zone effluent containing olefin polymer contaminants is passed through a separation system wherein unreacted propylene and a mixture of benzene and olefin polymers are separated from the cumene and are recycled to the reaction zone, the method of controlling the concentration of contaminants in the system which comprises passing a minor portion of about 1% of the total recycle benzene through a distillation zone for the removal of said polymer contaminants before returning said minor portion to the reaction zone.

7. The process of claim 6 in which the olefin polymer contaminants comprise hexenes.

8. The process of claim 6 in which the olefin polymer contaminants comprise nonenes.

9. A method of purifying an alkyl aromatic compound containing alkylation polymer contaminants prepared by alkylating an aromatic hydrocarbon with an olefin hydrocarbon in a reaction zone under conditions suitable to effect said alkylation reaction which comprises passing the effluent, containing materials which contaminate the alkylate from the alkylation zone through a separation system in which unreacted olefin is removed and recycled to the alkylation zone, further processing the remaining effluent to remove a mixture of unreacted aromatic compounds and said contaminated materials the major portion of which mixture is returned directly to the alkylation zone, passing the remainder of the unreacted aromatic compounds and contaminant materials to a third separation zone for the substantial removal of said contaminants and returning the uncontaminated aromatics to the alkylation zone, passing the reactant free alkylation zone effluent to a fourth separation zone and separating substantially pure alkyl aromatic compound therein.

10. A method of purifying cumene prepared by alkylating benzene with propylene in a reaction zone at a temperature between about 150° and about 300° C. and a pressure between about 20 kg. per square centimeter and about 70 kg. per square centimeter which comprises passing the effluent, containing olefin polymer contaminants from the alkylation zone through a separation system in which unreacted propylene is removed and recycled to the alkylation zone, further processing the remaining effluent to remove a mixture of unreacted benzene and said olefin polymer contaminants the major portion of which mixture is returned directly to the alkylation zone, passing the remainder of the unreacted benzene and olefin polymer contaminants to a third separation zone for the substantial removal of said contaminants and returning the uncontaminanted benzene to the alkylation zone, passing the reactant free alkylation effluent to a fourth separation zone and separating substantially pure cumene therein.

11. The process in claim 10 in which the olefin polymer contaminants comprise hexenes.

12. The process of claim 10 in which the olefin polymer contaminants comprise nonenes.

References Cited in the file of this patent

UNITED STATES PATENTS

| | | |
|---|---|---|
| 2,388,007 | Pardee et al. | Oct. 30, 1945 |
| 2,519,099 | Bailey et al. | Aug. 15, 1950 |